United States Patent [19]

Sakamoto et al.

[11] Patent Number: 5,266,868
[45] Date of Patent: Nov. 30, 1993

[54] GYROTRON INCLUDING QUASI-OPTICAL MODE CONVERTER

[75] Inventors: Keishi Sakamoto; Takashi Nagashima, both of Naka; Yoshika Mitsunaka, Yokohama, all of Japan

[73] Assignees: Japan Atomic Energy Research Institute, Tokyo; Kabushiki Kaisha Toshiba, Kawasaki, both of Japan

[21] Appl. No.: 799,309

[22] Filed: Nov. 27, 1991

[30] Foreign Application Priority Data

Nov. 27, 1990 [JP] Japan .................. 2-323747

[51] Int. Cl.$^5$ .................. H01J 25/00; H03B 9/01; H01P 1/16
[52] U.S. Cl. .................. 315/5; 331/79; 333/21 R
[58] Field of Search .................. 315/3, 4, 5; 331/79, 331/80, 81, 82; 333/21 R

[56] References Cited

U.S. PATENT DOCUMENTS

| | | | |
|---|---|---|---|
| 4,839,561 | 6/1989 | Ito | 315/5 |
| 4,926,094 | 5/1990 | Bondeson et al. | 315/4 |

FOREIGN PATENT DOCUMENTS

| | | |
|---|---|---|
| 141525 | 5/1985 | European Pat. Off. |
| 438738 | 7/1991 | European Pat. Off. |
| 2-261201 | 10/1990 | Japan . |
| 2096392 | 10/1982 | United Kingdom . |
| 2145576 | 3/1985 | United Kingdom . |

OTHER PUBLICATIONS

International Journal of Electronics—vol. 68, No. 3, Mar. 1990, London GB pp. 461–470. K. Yokoo et al.
13th Int. Conference on IR and MM waves, pp. 123-124—J. A. Casey et al.—Gyrotron Ecrh Transmission System.
Radio Engineering & Electronic Physics, pp. 14–17; S. N. Vlasov et al., Jun. 24, 1974; "Transformation of a Whispering Gallery Mode, Propagating in a Circular Waveguide, into a Beam of Waves".
Int. J. Electronics, 1988, vol. 65, No. 3, pp. 725–732; Osami Wada et al, "Calculation of Radiation from a Quasi-Optical Reflector Antenna for Whispering Gallery Mode".
ORNL/Sub/79-21453/21; "60 GHz Gyrotron Development Program"; J. F. Shively et al; pp. 100–110.

*Primary Examiner*—David Mis
*Attorney, Agent, or Firm*—Oblon, Spivak, McClelland, Maier & Neustadt

[57] ABSTRACT

There is provided a gyrotron including a quasi-optical mode converter wherein a solid dielectric layer such as silicon carbide for absorbing unnecessary millimeter waves generated by diffraction of the quasi-optical mode converter is arranged in annular shape in the periphery of the quasi-optical mode converter, and millimeter absorption fluid can be supplied to the periphery of the mode converter in a predetermined direction through vacuum barrier walls formed by a dielectric member, thereby efficiently absorbing the diffracted millimeter wave which is the cause of generating heat.

12 Claims, 3 Drawing Sheets

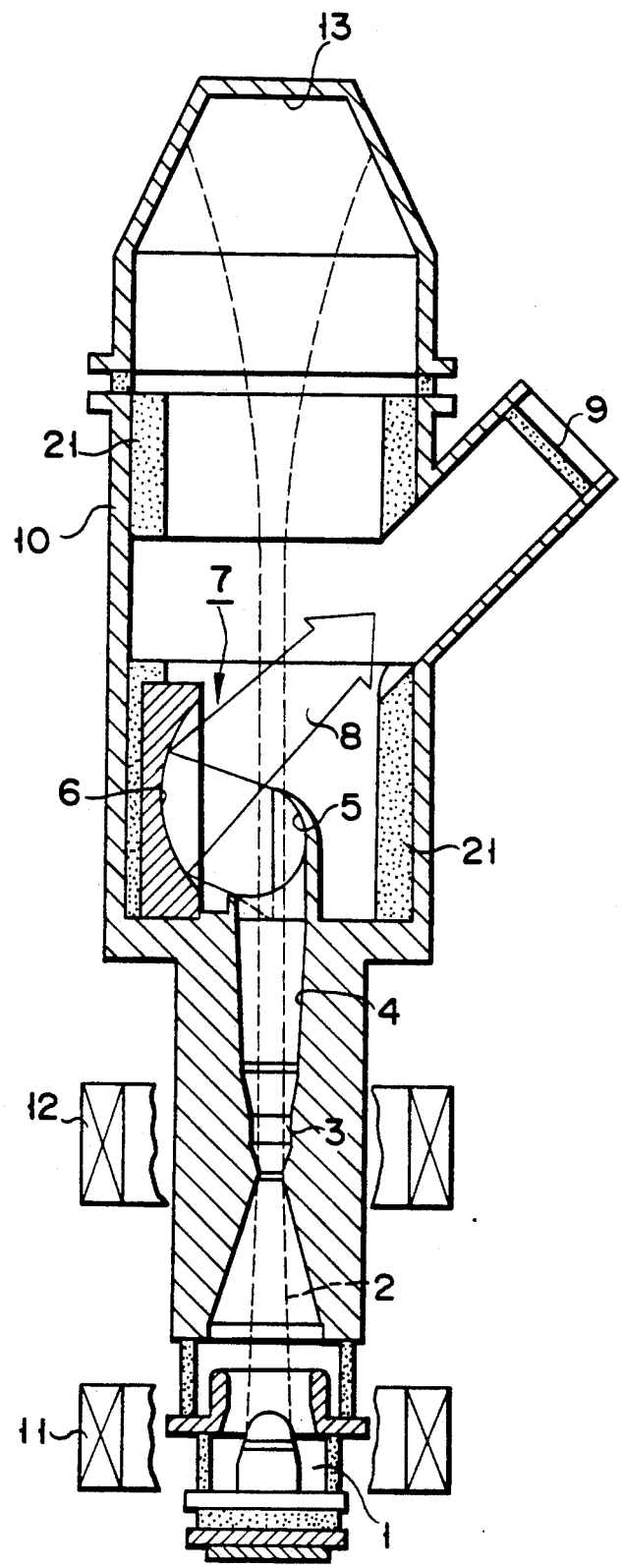
F I G. 1

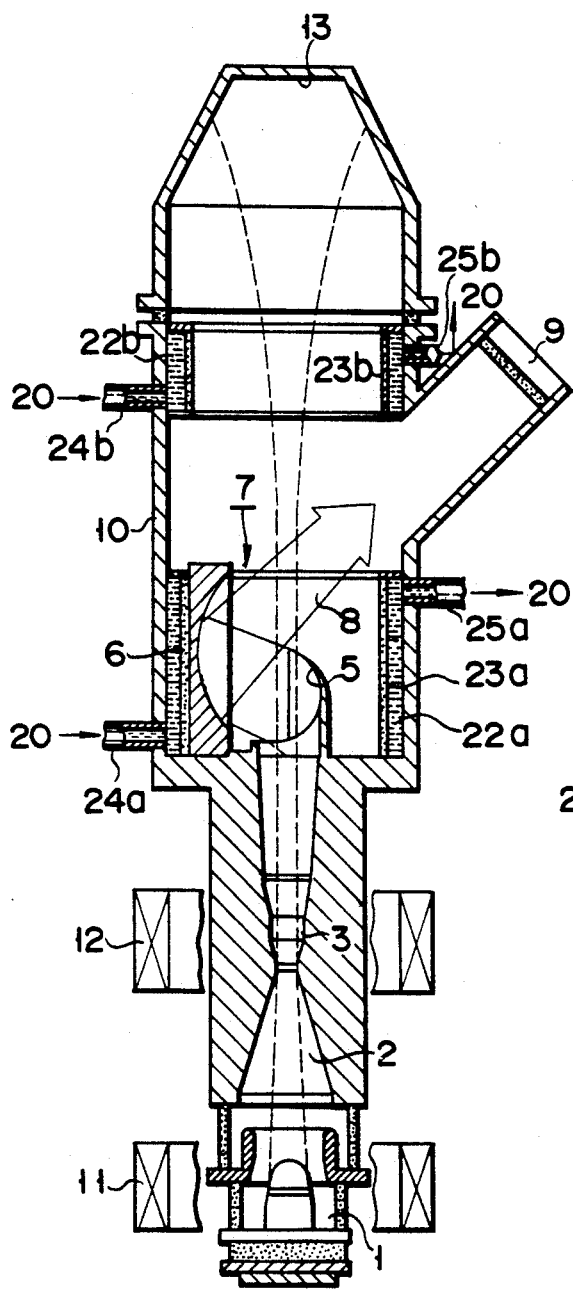
F I G. 2A
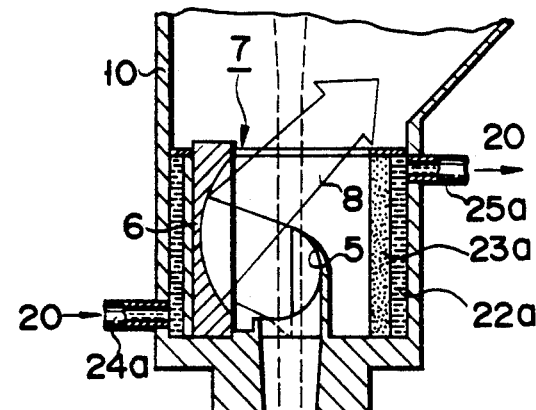
F I G. 2B
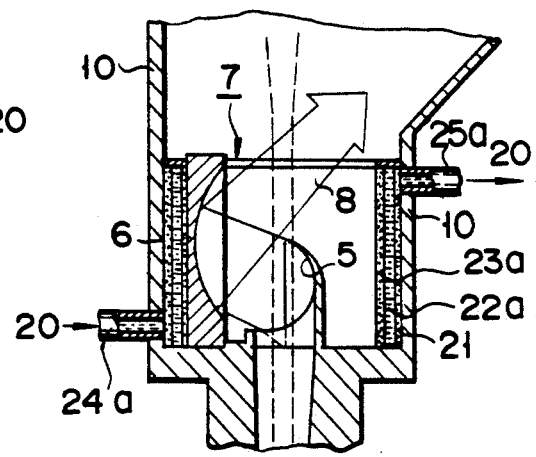
F I G. 2C
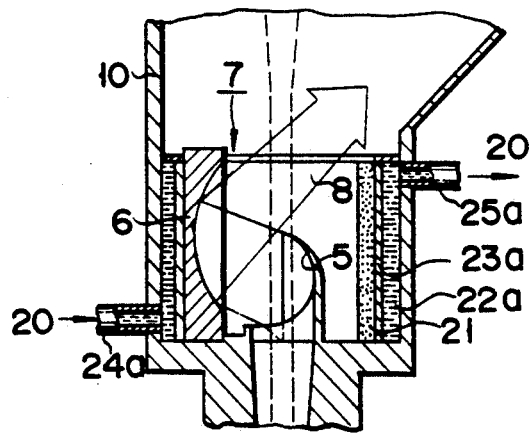
F I G. 2D

GYROTRON INCLUDING QUASI-OPTICAL MODE CONVERTER

BACKGROUND OF THE INVENTION

Field of the Invention

The present invention relates to a gyrotron including a quasi-optical mode converter.

Description of the Related Art

In recent years, studies have been conducted in which the electromagnetic wave of millimeter wave band is used as a means for heating plasma in a nuclear fusion reactor. As a high-power/high-frequency oscillating source in millimeter wave band, it has been hopeful about the gyrotron in a whispering gallery mode (W. G. M).

However, regarding this W. G. M, transmission loss of the wave is large in a waveguide. Due to this, it is recognized that this whispering gallery mode is not suitable for the transmission of high power to the nuclear fusion reactor, which is several tens of meters away from the oscillating source.

As one means for solving the above-mentioned disadvantage, it has been proposed that the whispering gallery mode millimeter wave is converted into a linear polarized beam, and the converted beam is transmitted in a quasi-optical mode while being focused and diverged by a reflecting mirror. More specifically, as the above-mentioned means, for example, there is used a quasi-optical mode converter (e.g., VLASOV Converter) described in the following documents:

Document 1: Vlasov, S.N. et al., 1975, Radio Engineering and Electronic Physics, vol. 21, No. 10, pp. 14–17; and Document 2: Osami Wada et al., Int. J. Electronics, 1988, Vol. 65, No. 3,7251-732.

Moreover, it has also been proposed that a quasi-optical mode converter having a reflector focusing the millimeter wave beam, which is shown in Japanese Patent Application No. 1-83506, is used and the whispering gallery mode is converted "a mode having a small transmission loss", and the beam is transmitted.

The above-mentioned quasi-optical mode converter can be partially or entirely built-in the gyrotron.

FIG. 3 shows a vertical cross sectional view of the gyrotron in which the above-mentioned quasi-optical mode converter is included.

In the drawing, reference numeral 10: a container wall for a vacuum state; 11: an electromagnet for applying a magnetic field, which is necessary for generating an electron beam 2; 12: an electromagnet for applying a magnetic field, which is necessary for oscillation; and 13: an electron beam collector for collecting the electron beam.

In the drawing, an annular electron beam 2 generated by an electron gun 1 is guided to a cavity resonator 3, and oscillated.

The whispering Gallery wave generated in a cavity resonator 3 is guided to a quasi-optical mode converter 7 which comprises a reflector 6 and a radiator 5 connected to a circular waveguide via a cavity resonator 3.

The whispering Gallery mode is converted to a millimeter wave beam 8 in the quasi-optical mode converter 7, and output to the outside via an output window 9.

Unlike the conventional gyrotron, which does not include the quasi-optical mode converter 7, it is unnecessary to form a waveguide in the electron beam collector 13. Due to this, there is a possibility that the whole apparatus will be enlarged, and this possibility will bring about an advantage in that the future gyrotron is operated at a constant output and large outputs.

However, in the above-structured gyrotron, there is a problem in the following point.

Generally, it is extremely difficult to reduce the loss, which is caused by the diffraction generated by the quasi-optical mode converter 7, to zero. Due to this, a part of the diffracted millimeter wave radiated from the radiator 5 cannot be output from the gyrotron tube, and stored inside the tube while many irregular reflection are repeated. Then, there is a situation in which the part of the millimeter wave reaches to the position of the cavity resonator 3 or that of the electronic gun 1. If the millimeter wave reaches to the position of the cavity resonator 3, there is a case that an unfavorable influence is exerted on the oscillation state.

When the wave reaches to the position of the electronic gun 1 through a circular waveguide 4, the electronic gun 1 is heated by the millimeter wave, and the temperature control of the electronic gun 1 itself becomes difficult. As a result, since the beam output of the electronic gun 1 changes, the millimeter wave energy output from the gyrotron changes. Due to this, a disadvantageous situation may occur in the heating control of plasma.

SUMMARY OF THE INVENTION

An object of the present invention is to provide a gyrotron wherein influence of diffraction of a quasi-optical mode converter is relaxed and the operation of the main apparatus and the output can be stabilized.

In order to attain the above object, the present invention provides the apparatus having the following structure.

The present invention provides a gyrotron including a quasi-optical mode converter. A solid dielectric layer made of such as silicon carbide is arranged in the periphery of the mode converter in order to absorb unnecessary diffracted waves slightly generated by diffraction of the quasi-optical mode converter. Also, millimeter absorption fluid can be supplied in the periphery of the mode converter through a vacuum barrier wall formed of the dielectric member.

In the above-structured gyrotron, the unnecessary diffracted waves generated by diffraction of the quasi-optical mode converter can be absorbed by the millimeter wave absorber. As a result, the unstable oscillating operation of the apparatus itself, which is caused by heat generated by the unnecessary diffracted waves, and the unstable output thereof can be prevented.

Document 3: ORIVL/Svb/79-21453/21

The above document 3 describes that silicon carbide mixture is arranged in the gyrotron tube. This document shows one example of the structure in which silicon carbide is arranged in the inner surface such that a beam tunnel portion has a high Rf damping in order to prevent the beam tunnel portion from serving as the cavity resonator and causing an abnormal generation. However, this is not the structure to realize the objects such as the prevention of abnormal heating of the electronic gun and the stable generation of the cavity resonator itself, which is caused by diffracted wave from a quasi-optical mode converter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a vertical cross section schematically showing a gyrotron of a first embodiment of the present invention;

FIG. 2A is a vertical cross section schematically showing a gyrotron of a second embodiment of the present invention;

FIGS. 2B to 2D are vertical cross sections schematically showing the main part of the modification of the second embodiment.

DETAILED DESCRIPTION OF THE PREFERRED EMBODIMENTS

Figure 3:
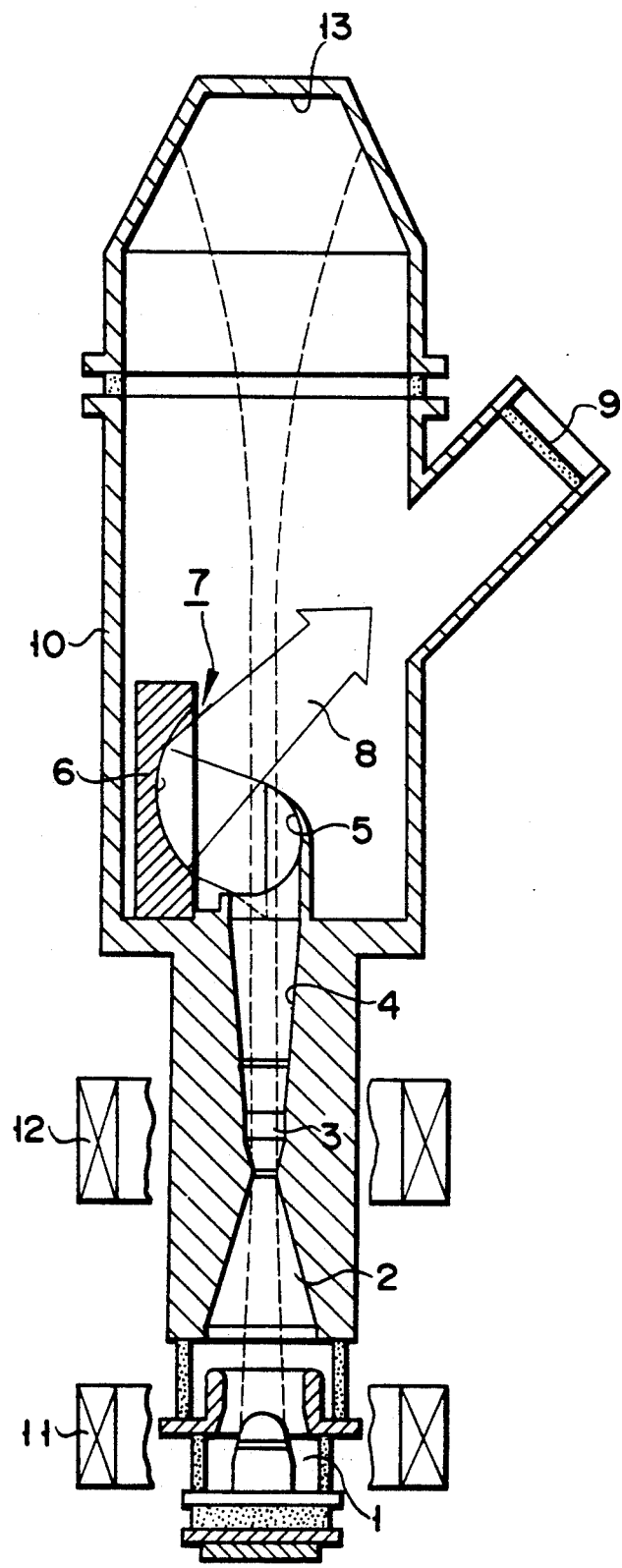
FIG. 3 is a vertical cross section schematically showing the conventional gyrotron.

In the gyrotron of the first embodiment shown in FIG. 1, the same reference numerals as FIG. 3 are added in the same portions as those of FIG. 3. Therefore, only the other characteristic portions will be explained in detail. The large different point from the conventional technique lies in the following point:

In a region, which encloses a quasi-optical mode converter 7 in an inner peripheral surface of a container wall 10 forming a space containing the quasi-optical mode converter 7, and which allows a millimeter wave beam 8 to be transmitted, there is provided a millimeter wave absorption layer 21, which is made of a solid dielectric layer, such as silicon carbide having a property in which millimeter waves are easily absorbed.

According to the above-mentioned structure, most of so-called diffracted millimeter waves, which are generated by diffraction of the quasi-optical mode converter 7 and remain in the tube, are absorbed by the millimeter wave absorption layer 21. As a result, the unnecessary millimeter waves can be controlled to be prevented from reaching to the cavity oscillator 3 and the electronic gun 1. Thus, the oscillating operation of the gyrotron itself and the output thereof can be stabilized.

The millimeter wave absorption layer 21 may be arranged at any position of the inside of the container wall 10 as a modification of the position of the arrangement of the layer 21. Also, a cooling system for cooling the millimeter wave absorption layer 21 may be further arranged.

In the gyrotron of the second embodiment and the modification shown in FIGS. 2A to 2D, similar to the above-explanation of the first embodiment, the reference numerals as those of FIG. 3 are added in the same portions as those of FIG. 3. Therefore, only the different portions will be will be explained in detail.

The main feature of the second embodiment lies in the following point.

In a region, which allows the millimeter wave beam 8 to be transmitted, in the inner peripheral surface of the container wall 10 forming a space containing the quasi-optical mode converter 7, there are provided vacuum barrier walls 23a and 23b formed of the dielectric L-member such that annular flow passages 22a and 22b are formed of the container wall 10. Also, the flow passages 22a and 22b are connected to fluid inlet pipes 24a and 24b, and fluid outlet pipes 25a and 25b. The so called "millimeter absorption fluid" such as water, steam is forcedly sent to the flow passages 22a and 22b through these pipes by a fluid supply source (not shown).

According to the above-mentioned structure, most of the so-called diffracted millimeter waves, which are generated by diffraction of the quasi-optical mode converter 7, pass through the vacuum barrier walls 23a and 23b formed of the dielectric member and advance in the flow passages 22a and 22b. Then, the diffracted millimeter waves are absorbed by the millimeter absorption fluid 21 in the flow passages, and the temperature of the absorption fluid rises. Moreover, in the external portion, there is arranged a fluid supply driving apparatus (not shown), which is connected to the respective tubes, and which forms a circulation route of fluid and forcedly drives fluid to be supplied. Therefore, the same operation and the effect as those of the first embodiment can be obtained.

It is not necessary for each part of the flow passages 22a and 22b is formed by the container wall 10, and a vacuum barrier wall member, which is different from the container wall 10, can be used.

The above-mentioned second embodiment and the other modification are shown in the vertical cross sections of the main parts of FIGS. 2B, 2C, and 2D, and each feature is shown in these figures.

In the modification shown in FIG. 2B, the vacuum barrier wall 23a (23b) may be formed of other materials such as a layer of silicon carbide which can easily absorb the millimeter waves.

Moreover, as shown in the modification of FIG. 2C, in the inside of the container wall 10, there may be provided passages 22a (22b) by a millimeter wave absorption layer 21 and dielectric members 23a (23b) which is transparent to millimeter waves. Also, there may be provided a circulation system in which the coolant and/or the millimeter wave absorption fluid pass through the passages.

In the modification shown in FIG. 2D, the millimeter wave absorption layer 21 is formed in the innermost portion of the tube, and the thin barrier wall 23a (23b) such as metal is formed in the outside of the absorption layer. Heat, which is absorbed in the absorption layer 21 on the innermost side by the vacuum barrier wall 23a (23b) forming such a double structure, is transmitted to the metal barrier wall 23a (23b) having a high coefficient of heat conductivity, and is absorbed by a coolant such as water flowing in the passages 22a (22b), and is efficiently carried to the outside of the apparatus.

In all cases, it is possible to use a fluid as a cooling material (e.g. coolant) of the millimeter absorption member.

In the above-mentioned embodiments, the subject matter of the present invention is applied to the gyrotron including the quasi-optical mode converter 7, which is formed such that reflector 6 converges the millimeter beam. The present invention can be applied to a gyrotron including a quasi-optical mode converter having a reflecting mirror whose curvature in the vertical direction is infinity, (e.g., parabolic surface).

The technical advantages of the above-mentioned embodiments and the modifications are as follows:

In order to remove heat in the electron beam collector, which is enlarged as enlarging the output of the apparatus and continuous outputting by a continuous output operation in this technical field in the future, it is necessary to include the quasi-optical mode converter. In this case, it is indispensable to efficiently absorb most of the disadvantageous millimeter waves, which are generated by diffraction of the quasi-optical mode converter and remain in the gyrotron tube. Therefore, it is required that the diffracted millimeter waves be absorbed by the millimeter wave absorption layer arranged as in the present invention, to prevent the unnecessary millimeter waves from reaching the main members of the apparatus (e.g., cavity oscillator or electronic gun). The above-structured gyrotron of the present invention can satisfy the above-mentioned requirements, and realize the stability of the continuous oscillating operation of the apparatus and the output.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A gyrotron including a quasi-optical mode converter, comprising millimeter wave absorption means for absorbing a millimeter wave generated by diffraction of said quasi-optical mode converter.

2. The gyrotron according to claim 1, wherein said millimeter wave absorption means includes a solid dielectric layer arranged in a peripheral area of said quasi-optical mode converter, which does not disturb a beam of the millimeter wave being transmitted, and absorbing the diffracted millimeter wave.

3. The gyrotron according to claim 2, wherein said millimeter wave absorption layer, contains silicon carbide.

4. The gyrotron according to claim 2, further comprising cooling means which cools said millimeter wave absorption means.

5. The gyrotron according to claim 4, wherein said cooling means comprises:
   vacuum barrier wall being together with container wall, which forms a space containing said quasi-optical mode converter, forming flow passages, and are made of metal having good thermal conductivity;
   a coolant supplied and flowing in said flow passages; and
   means for supplying said coolant through said flow passages.

6. The gyrotron according to claim 5, wherein said means for supplying said coolant is connected to said passages for forcedly supplying said coolant to said flow passages.

7. The gyrotron according to claim 5, wherein said vacuum barrier wall acts as said millimeter wave absorption means.

8. The gyrotron according to claim 5, wherein said coolant is formed of water, alcohol or halocarbon compounds.

9. The gyrotron according to claim 1, wherein said millimeter wave absorption means comprises flow passages, which is formed with vacuum barrier walls and a container wall, which forms a space containing the quasi-optical mode converter, and which allows a main millimeter wave beam to be transmitted;
   said vacuum barrier walls formed of a dielectric member which is transparent to the millimeter wave;
   fluid flowing in said flow passages and absorbing the millimeter wave; and
   means for supplying said fluid through said flow passages.

10. The gyrotron according to claim 9, wherein said fluid is a millimeter wave absorber coolant formed of water or steam.

11. The gyrotron according to claim 9, wherein said means for supplying said fluid is connected to said passages for forcedly supplying said fluid to said flow passages.

12. The gyrotron according to claim 9, wherein said millimeter wave absorption means acting as said solid dielectric layer is formed of silicon carbide formed in said flow passages.

* * * * *